Aug. 5, 1958     F. C. BAYER     2,845,939
COMBINED METERING VALVE AND FLOW DISTRIBUTOR
Filed Oct. 29, 1953     3 Sheets-Sheet 1

Inventor
Frank C. Bayer

Aug. 5, 1958   F. C. BAYER   2,845,939
COMBINED METERING VALVE AND FLOW DISTRIBUTOR
Filed Oct. 29, 1953   3 Sheets-Sheet 2

Inventor
Frank C. Bayer

Aug. 5, 1958  F. C. BAYER  2,845,939
COMBINED METERING VALVE AND FLOW DISTRIBUTOR
Filed Oct. 29, 1953  3 Sheets-Sheet 3

Inventor
Frank C. Bayer

# United States Patent Office 2,845,939
Patented Aug. 5, 1958

2,845,939

COMBINED METERING VALVE AND FLOW DISTRIBUTOR

Frank C. Bayer, Euclid, Ohio, assignor to Thompson Products, Inc., Cleveland, Ohio, a corporation of Ohio Application October 29, 1953, Serial No. 388,984

6 Claims. (Cl. 137—118)

The present invention relates to a combined metering valve and flow distributor. More particularly, the present invention relates to a combined pilot metering valve, flow distributor, and flow valves having a pair of flow paths which are flow isolated yet interrelated for control of flow through one of the paths by control of flow through the other of the paths.

Combined valve structures constructed in accordance with the principles of the present invention are structures of general utility for controlling flow of one medium through the structure by controlling flow of another medium through a separate path in the structure. One particularly advantageous utilization of the system lies in fuel control for gas turbines and the like as described in my copending application entitled "Fuel Flow and Control System," Serial No. 388,983, filed on even date herewith.

Prior art flow control devices have in general been limited to inclusion of the flow control elements in the flow path for the fluid to be controlled. These devices were subject to short life and unreliable control and inaccurate control when employed with low grade fuels such as "Bunker-C" containing a relatively high proportion of such contaminants as strong deterioration contaminants, varnishes and the like, and dirt and grit. Attempts to obviate these difficulties have proved either unsuccessful or commercially not feasible. One such attempt involved filtering and the like of the fuel before entering the control system but it has been found that filtering either does not remove the contaminants effectively or requires excessive space and excessive fluid pressures.

Another difficulty which has confronted the art is accurate control of metering and distribution to a plurality of valves which are individually controllable. Prior art devices designed with this end in view proved impractical since they either were too expensive or too space consuming.

By the mechanism of the present invention and the principles thereof all of these problems have been obviated and a compact combined metering valve and flow distributor of highly efficient construction is provided.

It is, therefore, an important object of the present invention to provide a combined metering valve and flow distributor having flow isolated paths for a control medium and a medium to be controlled, respectively.

Another important object of the present invention is to provide a combined metering valve and flow distributor having a centrally disposed fuel distributor valve, a centrally disposed control medium metering valve, and a plurality of circumferentially disposed fuel control valves, said fuel control valves having a control medium flow path to said control medium metering valve, and said fuel control valves having a flow path to said fuel distributor valve.

Still another object of the present invention is to provide a combined metering valve and flow distributor wherein the controlling elements are continuously operative in a clean control medium and other valve elements controlled by said first elements are operative in a second medium.

Yet another object of the present invention is to provide a new and improved combined metering valve and flow distributor structure having a pair of isolated flow paths which are isolated for independent flow and interconnected for matching preselected parameters of the mediums flowing through said paths.

Yet another object of the present invention is to provide a combined metering valve and flow distributor structure wherein control medium flow is maintained at a preselected proportion of flow of a medium controlled thereby.

Still other objects, features and advantages of the present invention will become readily apparent from the following detailed description of a preferred embodiment of the present invention and the principles of the present invention, from the claims, and from the accompanying drawings illustrating a preferred embodiment of the present invention and disclosing fully and completely each and every detail shown thereon, in which like reference numerals refer to like parts, and in which:

Figure 1:
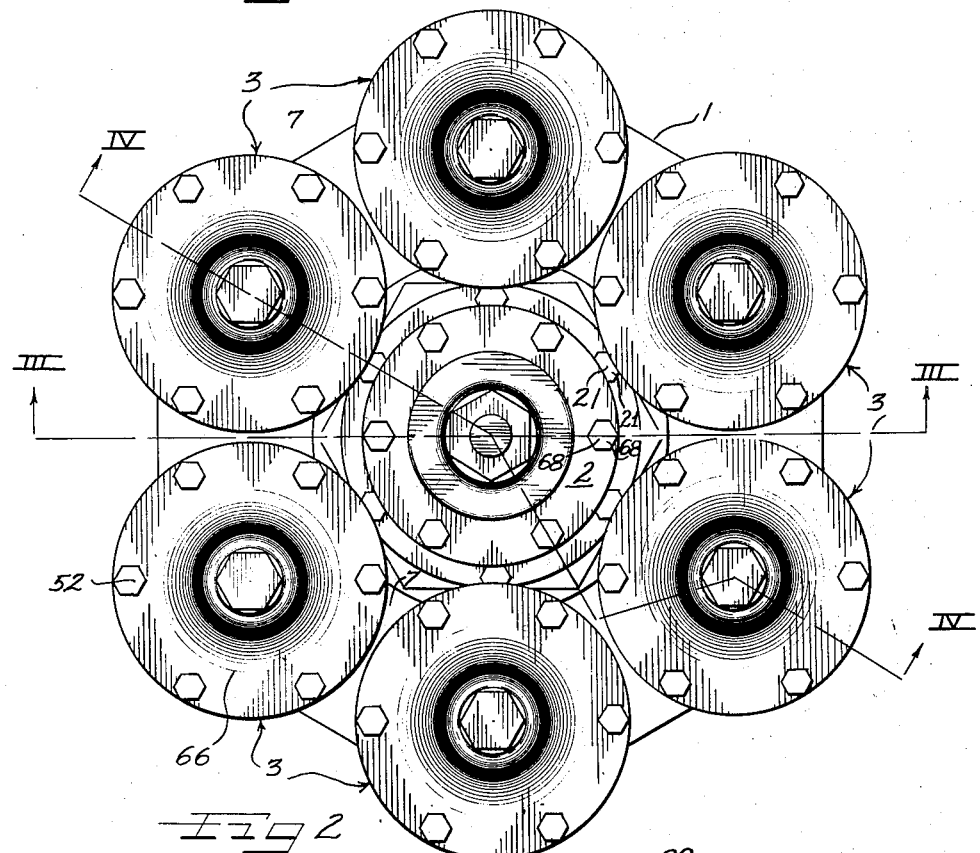
Figure 1 is a plan view of a combined metering valve and flow distributor and individual control valves forming a preferred embodiment of the present invention.
Figure 2:
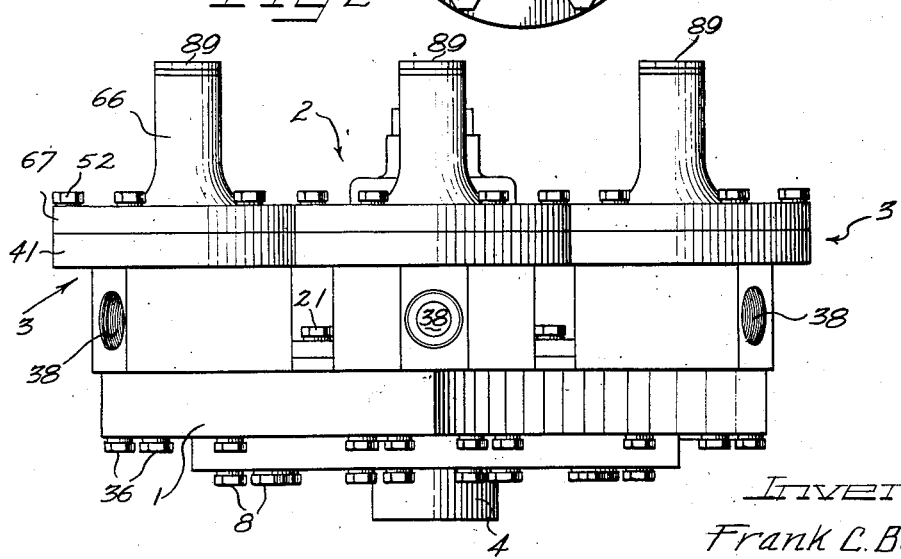
Figure 2 is an elevational view of the structure of Figure 1.

Although the combined valve structure forming this embodiment of the present invention is one of general utility it will be hereinbelow described as a fuel flow and control device most advantageously employable as described in my above identified copending application. Therefore, reference will be made to fuel flow, fuel flow paths and control medium flow and control medium flow paths. The fuel to flow through the fuel flow paths in this embodiment of the present invention may be any desired type of fuel such as diesel oil or "Bunker-C," individually or combined, while the control medium may be any desired control medium such as clean lubricating oil or the like supplied from any appropriate source such as a tank or the lubrication system of an internal combustion device such as a gas turbine or the like. Further, reference will be made to the fuel control valves which are plural in number and six of which are shown here. It will be understood that although these valves, when connected in the system of my aforementioned copending application, are individually connected to the fuel nozzles of the combustion device, any desired number of the same may be provided in accordance with the principles of the present invention and the number of the same is not critical.

The illustrated structure forming this preferred embodiment of the present invention is provided with a base plate or fuel plate 1 upon which there is securely mounted a combined control medium or oil metering valve and flow distributor valve assembly, indicated generally at 2, and a plurality of individually referenced secondary fuel control valves 3. The base plate or fuel plate 1 may have any desired plane configuration such as round or polygonal or the like as desired and has herein been shown as being hexagonal for mounting of six individual fuel control valves 3.

A central outwardly extending boss 4 which is axially bored as at 5 provides a fuel inlet to the fuel flow distributor portion 2a of the combined assembly 2. Threads 6 in the region of the outer end of the inlet passage or bore 5 through the boss 4 and remainder of the thickness of the plate 1 leading to the flow distributor portion 2a of the combined structure and assembly 2, provide for convenient securing of a fuel inlet tube (not shown) to the inlet passage or bore 5.

Figure 3:
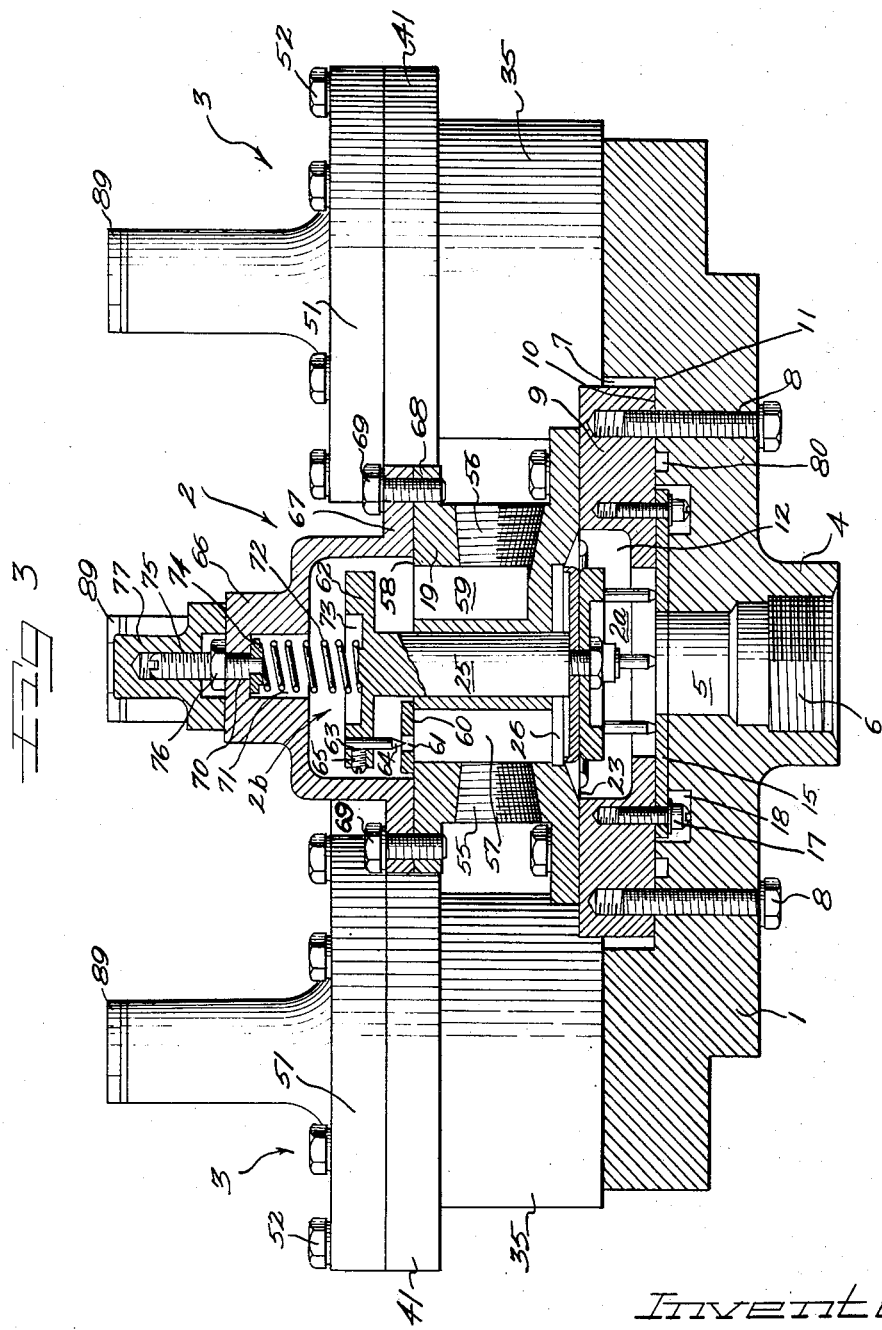
Figure 3 is a sectional view of the structure of Figure 1 taken substantially along the line III—III thereof.

The combined metering valve and flow distributor assembly 2 is mounted in a recess 7 in a face of the base plate 1 opposite to the face carrying the boss 4 by any convenient means such as machine screws or the like 8, Figure 3. Specifically, the fuel distributor portion 2a of the assembly 2 is adjacent to the base plate 1 and partially in the recess 7, which is preferably substantially coaxial with the fuel inlet bore 5. A flow distributor fuel plate 9 of any desired peripheral configuration such as round or polygonal or the like, is face sealingly seated in the recess 7 so that its lower face 10 is sealingly faced against the upper face 11 of the base block 1 in the recess 7 and is secured in place by the machine screws or bolts or the like 8. This distributor mounting plate 9 is also centrally apertured to have a central shoulder passage 12 therethrough preferably substantially coaxial with the fuel inlet bore 5 and with the smaller diameter portion 13 thereof adjacent to the base 1. The base 1 is further coaxially recessed as at 14 for reception of a fuel distributor orifice plate 15 sealed between the distributor mounting block 9 and the base block 1. A central aperture 16 through the orifice plate 15 registers with the fuel inlet bore 5 and provides a fuel inlet into the flow distributor portion 2a of the assembly 2.

The seals between the distributor block 9 and the base block 1 and between the orifice plate 15 and the distributor plate 9 and the base block 1 prevent fluid leakage therebetween and may be either metal to metal seals or appropriate gasket seals or the like as desired. Although the seal between the distributor block 9 and the base block 1 at the faces 10 and 11 respectively is an important seal which should definitely prevent fluid leakage, the seals between the orifice plate 15 and the base block 1 and the distributor block 9 are also important and slight leakage about the orifice plate 15 would be somewhat damaging to proper control. The orifice plate 15 is preferably an assembly secured to the distributor base block 9 by any convenient means such as machine screws or bolts or the like 17, the heads of which are disposed in appropriate notches or grooves 18 in the base block 1.

A valve piston cylinder block 19 is secured to the upper face 20 of the flow distributor block 9 by machine screws or the like 21 extending through a flanged lower face area 22 of the cylinder block 19. The cylinder block 19 sealingly secures a valve diaphragm 23 between its flanged lower face 22 and the upper face 20 of the distributor block in such a manner that fuel from the inlet 5 is confined below the diaphragm 23 and within the fuel distributor portion 2a of the combined assembly 2. The cylinder block 19 has a central cylinder 24 therein for reciprocal acceptance of a valve piston 25 therethrough. Although the piston 25 is preferably closely fitted into the cylinder bore 24 slight leakage for lubrication purposes etc., is not harmful to the control of the system as hereinafter further described.

Figure 4:
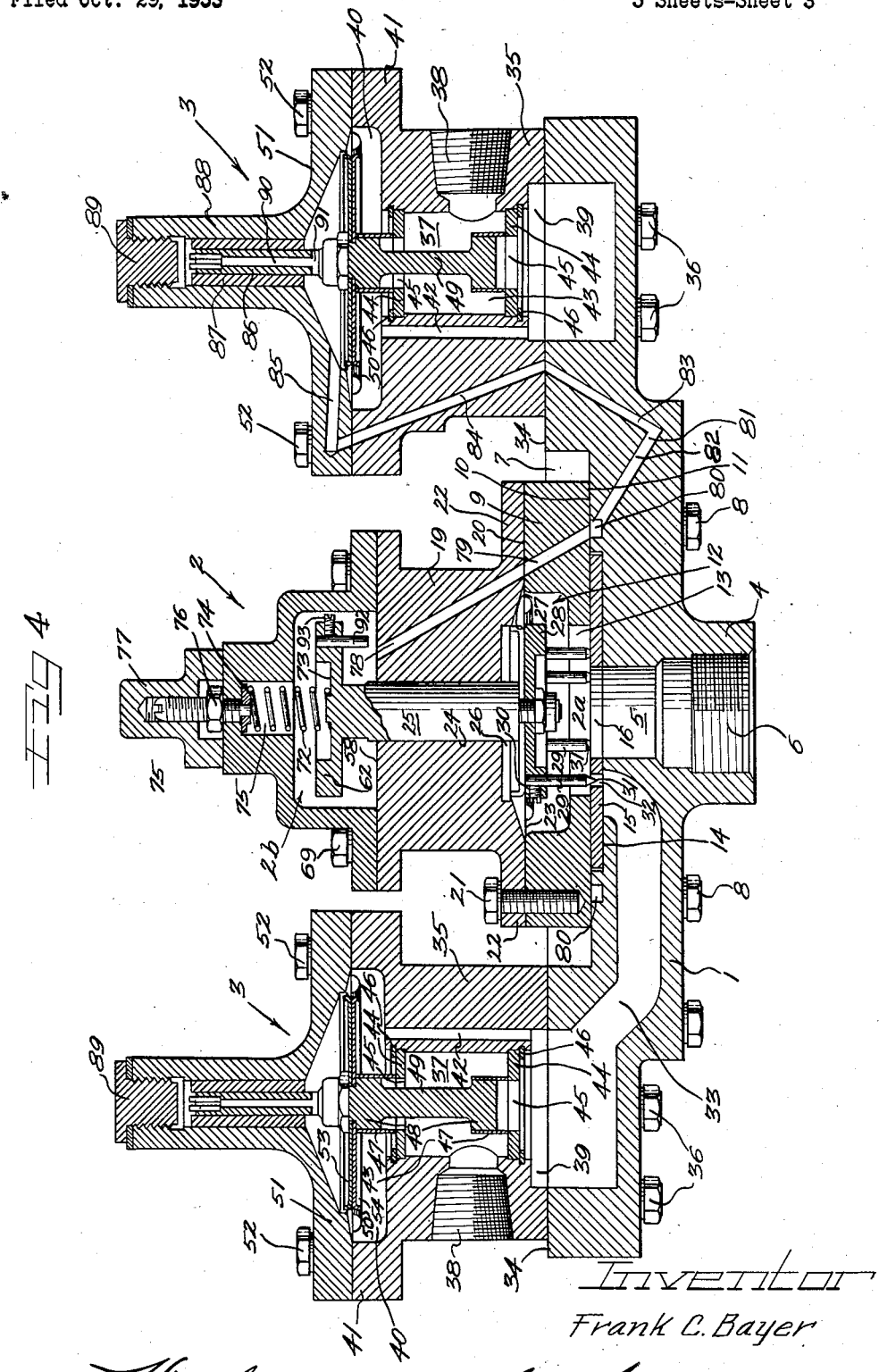
Figure 4 is a sectional view of the structure of Figure 1 taken substantially along the broken line IV—IV thereof.

The cylinder 25 and the cylinder bore 24 are preferably substantially coaxial with the inlet 5 and the piston 25 extends into a recess 26 in the region of the lower face of the cylinder block 19 and is secured to diaphragm strengthening and antidistortion plates 27 and 28 affixed to upper and lower sides of the diaphragm 23 respectively. The piston 25 is thereby fixed for reciprocation together with axial deflection of the diaphragm 23. The lower diaphragm strengthening plate 28 carries a plurality of distributor needle valve pins 29 which are adjustably secured thereto as by set screws or the like 30 (see Figure 4). The number of flow distributor pins is not critical but should be at least equal to the number of fuel control valves 3 forming a part of the structural assembly of the present invention. As shown in Figure 4, each of these pins has a tapered lower distributor valve tip as at 31 mating with an equal plurality of appropriately positioned distributor valve orifices 32 through the orifice plate 15 so that controlled axial deflection of the diaphragm 23 variably controls fuel metering through each of the fuel distributor apertures 32.

Fuel flow through the inlet passages 5 and 16 into the flow distributor portion 2a of the assembly 2 below the diaphragm 23 passes through the fuel metering and distributor orifices 32 when the diaphragm 23 has been deflected upward to raise the valve pin tips 32 out of closed valve engagement with the orifice plate 15, and thence through a plurality of fuel control feed passages 33 individually communicating with the individual orifices 32 and extending through the base block 1 to the upper face 34 of the base block 1 thus providing individual fuel feed passages or inlet passages to the individual fuel control valves 3, respectively. Each of the fuel control valves 3 has a cylinder body member 35 sealingly secured to the upper face 34 of the base 1 by any convenient securing means such as machine screws or the like 36 and provided with a central bore 37 leading to a fuel outlet 38 for coupling the same to individual fuel nozzles of a gas turbine or the like as described in the above identified copending application showing a preferred utilization of the structure of this invention. The outlets 38 are preferably threaded or the like as indicated for providing good coupling to fuel tubes or the like.

The central substantially axial longitudinal bores 37 in the control valve cylinder bodies 35 are preferably enlarged at upper and lower ends thereof as indicated at 40 and 39, respectively. The lower enlarged portion 39 of the bore 37 registers with the appropriate fuel passage 33 for each of the nozzle valve structures while the upper enlarged area 40 of the bore 37 is positioned in a flanged upper end 41 of the cylinder body 35 and is preferably substantially larger in diameter than the bore 37. The two larger diameter sections of the bore 37 are intercommunicated by a fuel passage or aperture 42 in each of the control valve bodies 35 so that fuel may be provided to the outlets 38 through both ends of the central lesser diameter section 43 of the bore 37.

A pair of centrally apertured control valve orifice rings or plates 44, centrally apertured as at 45 are disposed in shoulder recessed opposite end of the intermediate smaller diameter section 43 of the bore 37 and secured in place preferably by snap rings 46 or the like fitted into appropriate grooves in the side wall of the area 43 of the bore 37 in each of the control valve cylinder bodies 35.

Each of the fuel apertures 45 may be opened and closed for controlled fuel flow by valve sleeves 47 press fitted onto flanged areas 48 of control valve pistons 49 secured to a controlled axially deflectable diaphragm 50.

The diaphragm 50 which is substantially identical to the diaphragm 23 of the assembly 22 is secured between the upper face of the flange portion 41 of the control valve cylinder body 35 and a reference oil head member 51 which is secured to the body member 35 by any convenient means such as screws or bolts or the like 52. The diaphragm also has secured to upper and lower faces thereof antidistortion plates 53 and 54 respectively and the fuel control valve piston 49 is secured thereto in any convenient manner. The control valve sleeves 47 are so press fitted onto the shoulder portions 48 of the control valve pistons 49 that raising and lowering deflection of the diaphragm 50 of each of these valve structures raises and lowers the valve sleeves 47 out of and into valve opening and closure engagement with the plates 44 about the apertures 45 therein so that when the diaphragm is deflected downward fuel flow decreases or stops while upward deflection of the diaphragm opens the fuel control valves for fuel flow therethrough. In this construction, with the valves open, fuel flow passes through the main inlet 5 through the distributor orifices 32, through the fuel distribution passages 33, through the lower control valve aperture plate 44, through the connecting passage 42 and through the upper control valve aperture plates 44, into the intermediate cylinder section 43 and therethrough to the fuel outlet ports 38.

Fuel flow is controlled, in accordance with the principles of the present invention, by a control medium such as oil or the like which has a separate and distinct flow path from the fuel flow path just described coupling the same to the upper sides of the several diaphragms 23 and 50 so that fuel flows in accordance with the differential pressure between the control oil and the fuel.

To this end, the cylinder block 19 is provided with a main control oil inlet 55 and a main control oil outlet 56 threaded through preselected portions of the side wall of the cylinder block 19. An aperture of appropriate dimensions extends longitudinally through the cylinder block, as indicated generally at 57, and communicates the oil inlet 55 with the recess 26 and the lower face area of the block 19 and through the upper face 58 of the cylinder block 19. A second or outlet aperture 59 extends from the upper face 58 of the cylinder block 19 to the outlet port 56, but does not extend to the recess 26 on the upper side of the diaphragm 23.

A control oil metering orifices plate 60 is secured to the upper face 58 of the cylinder block 19 and sealingly covers the upper end of the inlet aperture 57 longitudinally through the block 19. A metering orifice 61 through the plate 60 communicating with the passage 57, is substantially identical in dimensions to any selected one of the apertures 32 in the distribution orifice plate 15. At its upper end the piston 25 is transversely flanged as at 62 and carries a metering valve pin 63 having a tapered valve head 64 reciprocable with the piston 25 for opening and closing the control oil metering valve orifice 61 in the manner of opening and closing the flow distributor orifices 32 by the tapered valve pin heads 31 upon axial deflection of the diaphragm 23. The valve pin 63 is adjustably secured to the flange 62 by any convenient means such as a set screw or the like 65.

A flanged and stepped control oil metering valve cover 66, having a flanged portion 67 at the lower end thereof is secured to a flange or the like 68 at the upper end or upper surface 58 of the cylinder block 19. These parts are secured together by any convenient means such as machine screws or the like 69 and are so secured as to provide a seal, either metal to metal or gasket, against control oil leakage from between the flanges 68 and 67 of the block and cover 19 and 66, respectively. The stepped cover 66 is a substantially stepped hollow structure providing a sealing housing cover for the metering valve portion 2b of the combined structure 2. In the region of its upper end the cover 66 is of reduced diameter having a small coaxial threaded bore therein, as at 70, leading to an intermediate diameter portion of the hollow in the cover 66. This intermediate diameter portion, indicated generally at 71, houses and guides the upper end of a biasing spring 72 the lower end of which seats in a biasing spring recess 73 in the flanged upper portion of the piston 25 and the upper end of which seats against an adjustable biasing spring seat member 74 adjustably positioned by a screw member 75 threaded through the aperture 70 and fixed in its adjusted position by an adjusting nut 76. Thereabove a cap member 77 is threaded down onto the adjusting screw 75 and against the upper end of the cover 66 for securing these several members in position and against accidental maladjustment.

By the provision of the biasing spring 72 which is axially aligned with the piston 25, the diaphragm 23 and the metering valve and flow distributor valves are biased downward or into closing relation respectively by the sum of biasing spring pressure and control medium pressure; the biasing spring acting directly on the piston 25 and the inlet control oil pressure acting directly against the diaphragm 23 and the upper antideflection plate 27. In this manner there is control medium flow and fuel flow only when the fuel pressure against the under side of the diaphragm 23 exceeds biasing spring pressure and control medium pressure. Further, under shut down conditions the biasing spring 72 maintains the several valves closed.

It will also be readily observed that the herein above described fuel flow path is completely flow isolated from the control oil flow path from the inlet 55 through the metering valve orifice 61 and thence through the bottomed aperture 59 to the main outlet 56 and from the inlet 55 to the recess 26 leading to the diaphragm 23, and that the two flowing mediums are pressure matched and balanced by the interconnecting operation of the diaphragm valve structure.

In accordance with the principles of the present invention the control medium flow rate is maintained as a pre-established proportion of the fuel flow rate by the intercoupling of the distributor valve pins 29 and the metering valve pin 63 through the piston 25 and by providing the control oil orifice 61 of substantially the same diameter as the fuel distributor orifices 32. In this manner of structure, when there are six flow distributor orifices 32 then the flow through the control oil orifice 61 will be one-sixth the fuel flow rate. The specific proportion is not critical but is highly desired in control systems to maintain the control oil flow rate at a preselected proportion of the fuel flow rate for various control purposes such as maintaining the fuel nozzles of a gas turbine or the like in slave relation to a fuel nozzle simulating valve connected to the outlet 56 as described in my above identified copending application.

Another important aspect of the provision of a control oil metering valve lies in individual control of the fuel control valves 3 and in matching fuel outlet pressure from the orifices 32 against control oil outlet pressure from the control oil metering orifice 61.

This is accomplished by delivering control oil at outlet pressure to the upper sides of the individual fuel control diaphragms 50. One or more passages 78 through the cylinder block 19 of the assembly 2 and corresponding passages 79 through the distribution block 9 and in communication with the passages 78, deliver control oil at outlet pressure to a ring manifold groove 80 in the transverse face 11 of the recess 7 in the base block 1. The control oil outlet pressure common manifold ring recess 80 has a plurality of passages 81 leading therefrom to the upper surface 34 of the base block 1, each passage 81 leading to each of the cylinder blocks 35 for the control valves 3 respectively. For convenience of construction the passages 81 are each formed by a pair of bored interconnected bottomed passages 82 and 83 so that the passages 81 may be formed in a simple machining operation.

From the upper end of the passage 83 at the upper face 34 of the block 1, each of the cylinder blocks 35 for the fuel control valves 3 has a passage or control oil conduit 84 leading to a communicating passage 85 in the control valve caps or covers 51. Thus, control oil at outlet pressure is delivered to the upper side of the diaphragms 50 through the passages 78, 79 to the common manifold 80 and therefrom through the passages 81, 84 and 85.

With control oil at outlet pressure delivered to the upper side of the diaphragms 50, the diaphragms 50 are axially deflectable in accordance with and as a function of the differential pressure between the control oil and the fuel so that the control valves 3 are individually controlled. Movement of the diaphragm is reflected in axial displacement of the fuel control valve pistons 49 which are prevented from movement other than axial displacement by piston extensions 86 cylindrically slidable in sleeves 87 press fitted into a cylindrical upper end portion 88 of the fuel control valve covers or caps 51. The cylindrical upper end portions 88 are closed and sealed against control oil escape therefrom by threaded plugs or the like 89. To permit easy and free movement axially of the piston extensions 86 within the cylinder sleeves 87, there is a relatively loose sliding fit between these parts thereby permitting the control oil to lubricate the contacting surfaces.

To avoid trapping of control oil above the upper ends of the piston extensions 86 and possible head lock occurring as a result of pumping action of the pistons 49, the piston extensions 86 are axially bored or drilled as at 90 and transversely bored or drilled at their base as at 91 thereby permitting the free movement of control oil from the upper end of the piston extension 86 to the region of the upper surface of the diaphragm 50 and the upper antideflection plate 53 of each of these valve structures.

From the foregoing it will be readily seen that the delivery of fuel to the main fuel inlet 5 and the delivery of control oil to the main control medium inlet 55 will accomplish differential opening and closing of the metering valve orifice 61 and the distributor valve orifices 32 through differential pressure and axial movement of the piston 25. Of course, should control oil pressure at the inlet 55 become too excessive downward movement of the piston 25 and of the valve pins 29 and 63 is limited by a stop pin 92 adjustably fixed to the flange 62 of the piston 25 by a set screw or the like 93 for abutment against the upper face 58 of the cylinder body 19.

Movement of piston and metering pin assembly 25 occurs as the result of the difference between fuel inlet pressure in chamber 2a and control oil outlet pressure in chamber 2b acting on the unbalanced area of the entire piston assembly. The control oil and the fuel are preferably supplied to this device at equal pressures as described in my above identified copending application. This being the case, the pressures on either side of diaphragm 23 are equal and the diaphragm is not subjected to differential pressures. The control oil in chamber 2b, however, is at outlet pressure (downstream pressure of metering orifice 61) and hence at a lower pressure than exists in chamber 2a (inlet pressure). The net pressure differential acting on the piston assembly 25 to cause movement is this difference between inlet pressure in chamber 2a and the metering orifice downstream pressure in chamber 2b. The pressure differential is therefore equal to the pressure drop across the metering orifice. The area of the piston assembly acted upon by the differential pressure is substantially equal to the cross-sectional area of the piston portion engaged in bore 24. As flow increases, the pressure drop across the metering orifices increases resulting in further opening of the metering orifices.

The valves 3 insure that the outlet pressure of the metering orifices 32 is equal to the outlet pressure of metering orifice 61. Since the inlet pressure to these orifices is also equal and the orifices are equal in size, flow through all seven orifices (32 and 61) is substantially identical at all times. The several fuel nozzle valves 3 are independently controlled by differential pressure deflection of the diaphragms 50.

By the structure and principles of this invention flow of any desired type of fuel ranging from the highest grade fuels to the lowest grade fuels may be carefully controlled and distributed through valve elements which are substantially not subject to clogging or the like and which are controlled by clean control medium flow through separate and distinct valve members.

It will be readily understood that numerous variations and modifications may be accomplished without departing from the true spirit and scope and principles and novel concepts of the present invention. I, therefore, intend to cover all such modifications and variations as fall within the true spirit and scope of the novel concepts and principles of this invention.

I claim as my invention:

1. A combined metering valve and flow distribution assembly, comprising, a base block, a fluid inlet aperture through said base block, a central recess in a transverse face of said base block, a plurality substantially radial passages through said base block communicating with said recess and said transverse face in the region of the periphery of said block, a distributor valve plate in said recess, a plurality of distributor valve orifices in said distributor valve plate, and leading to said passages individually, a distributor valve block secured in said recess over said valve plate, a cylinder block secured to said distributor valve block and securing a valve isolation diaphragm therebetween one side of said diaphragm being in communication with said fluid inlet, a piston extending through said cylinder block and secured to said diaphragm, a control fluid passage through said cylinder block said control fluid passage being in communication with the other side of said diaphragm, a fluid inlet to said passage through said cylinder block, a metering valve plate closing an end of said control fluid passage opposite to the end thereof adjacent to the diaphragm, a metering valve orifice in said metering valve plate, a plurality of valve pins secured to said piston for axial movement together therewith to open and close the distributor valve orifices and the metering valve orifice respectively in response to a predetermined pressure differential value on opposite sides of said diaphragm, a plurality of diaphragm type valves secured to said base block in flow communication with said plurality of substantially radial passages, and other fluid passages from an outlet side of said metering valve orifice plate to said diaphragm type valves for differential pressure actuation and control thereof.

2. A combined metering valve and flow distributor comprising a housing, an axially deflectable diaphragm within said housing, a pair of fluid flow paths isolated each from the other and admitting fluid therefrom to opposite sides of said diaphragm respectively, a flow distributor orifice plate having a plurality of orifices therein disposed in one of said flow paths, an equal plurality of flow distributor valve pins operative selectively to open and close said orifices respectively upon appropriate deflection of said diaphragm in response to predetermined pressure differences on opposite sides of said diaphragm, a second valve orifice plate arranged in the other of said fluid flow paths and having a flow orifice therein, and a valve pin mounted for movement with said diaphragm to open and close the flow orifice of said second orifice plate upon deflection of said diaphragm, whereby fluid flowing through said paths is simultaneously controlled.

3. A combined metering valve and flow distributor comprising, an axially deflectable diaphragm, a pair of fluid flow paths isolated each from the other admitting fluid therefrom to opposite sides of said diaphragm respectively, a flow distributor orifice plate having a plurality of orifices therein positioned below said diaphragm and in one of said flow paths, an equal plurality of flow distributor valve pins secured to said diaphragm and positioned to open and close said orifices respectively upon appropriate deflection of said diaphragm due to differences in fluid pressure in said flow paths, a second valve orifice plate in the other fluid flow path and having a flow orifice therein, and in additional valve pin mounted for movement within said diaphragm to open and close said flow orifice together with opening and closing of said plurality of orifices in said flow distributor orifice plate whereby fluid flow through said paths is simultaneously controlled.

4. A combined metering valve and flow distributor comprising, an axially deflectable diaphragm, a pair of fluid flow paths isolated each from the other and admitting fluid therefrom to opposite sides of said diaphragm respectively, a flow distributor orifice plate having a plurality of orifices therein positioned below said diaphragm and in one of said flow paths, an equal plurality of flow distributor valve pins secured to said diaphragm and positioned to open and close said orifices respectively upon appropriate deflection of said diaphragm due to differences in fluid pressure in said flow paths, a second valve orifice plate in the other fluid flow path and having a flow orifice therein, and an additional valve pin mounted for movement within said diaphragm to open and close said flow orifice together with opening and closing of said plurality of orifices in said flow distributor orifice plate whereby fluid flow through said paths is simultaneously controlled and flow through said second orifice may be maintained at a preselected proportion of flow through said flow distributor orifice plate.

5. A valve assembly comprising, a flow distributor valve structure having a plurality of ganged co-actuatable valve members controllably to limit flow of a first fluid, a diaphragm deflectable in response to predetermined values of pressure of said first fluid, a control medium metering valve co-actuatable with said plurality of valve members, a plurality of individually operable secondary valve structures, a passage from each of said ganged valve members to each of said secondary valve structures, and a passage from said metering valve to each of said secondary valve structures whereby control medium flow through said metering valve to said plurality of individually operable secondary valve structures is maintained proportional to flow of said first fluid past said valve members to the individually operable valve structures and said control medium controls flow of said first fluid past said valve members and through said secondary valve structures.

6. A valve assembly comprising, a flow distributor valve structure having a diaphragm, a plurality of ganged co-actuatable needle valve members controllably to limit the flow of a first fluid, said needle valve members being movable in response to predetermined values of pressure on each side of said diaphragm, a common inlet for said needle valves, individual outlets from said needle valves, a control metering needle valve co-actuatable with said plurality of needle valve members and said diaphragm, a plurality of individually operable secondary valve structures equal in number to the number of said ganged needle valves, individual flow passages from the outlet of each of said ganged needle valves to each of said valve structures, and a passage from the outlet of said metering valve to each of said secondary valve structures, said secondary valve structures including diaphragm means isolating flow from said metering valve from flow from said ganged needle valves whereby control fluid flow through said metering valve to each of said valve structures is maintained proportional to the flow of said first fluid past said diaphragm and said co-actuatable needle valve members to said secondary valve structures and control fluid flow controls the flow of said first fluid.

References Cited in the file of this patent

UNITED STATES PATENTS

| | | |
|---|---|---|
| 790,584 | Manning | May 23, 1905 |
| 810,590 | Whitehead | Jan. 23, 1906 |
| 1,680,750 | Smoot | Aug. 14, 1928 |
| 1,877,576 | O'Connor | Sept. 13, 1932 |
| 2,127,172 | Hermitte | Aug. 16, 1938 |
| 2,395,384 | Ziebolz | Feb. 19, 1946 |
| 2,588,348 | Budlane | Mar. 11, 1952 |
| 2,622,610 | Rowe | Dec. 23, 1952 |
| 2,706,520 | Chandler | Apr. 19, 1955 |